June 3, 1958
W. J. SAKOWSKI
2,837,408
PROCESS AND APPARATUS FOR THE CATALYTIC
DECOMPOSITION OF ALKALI METAL AMALGAMS
Filed June 29, 1954
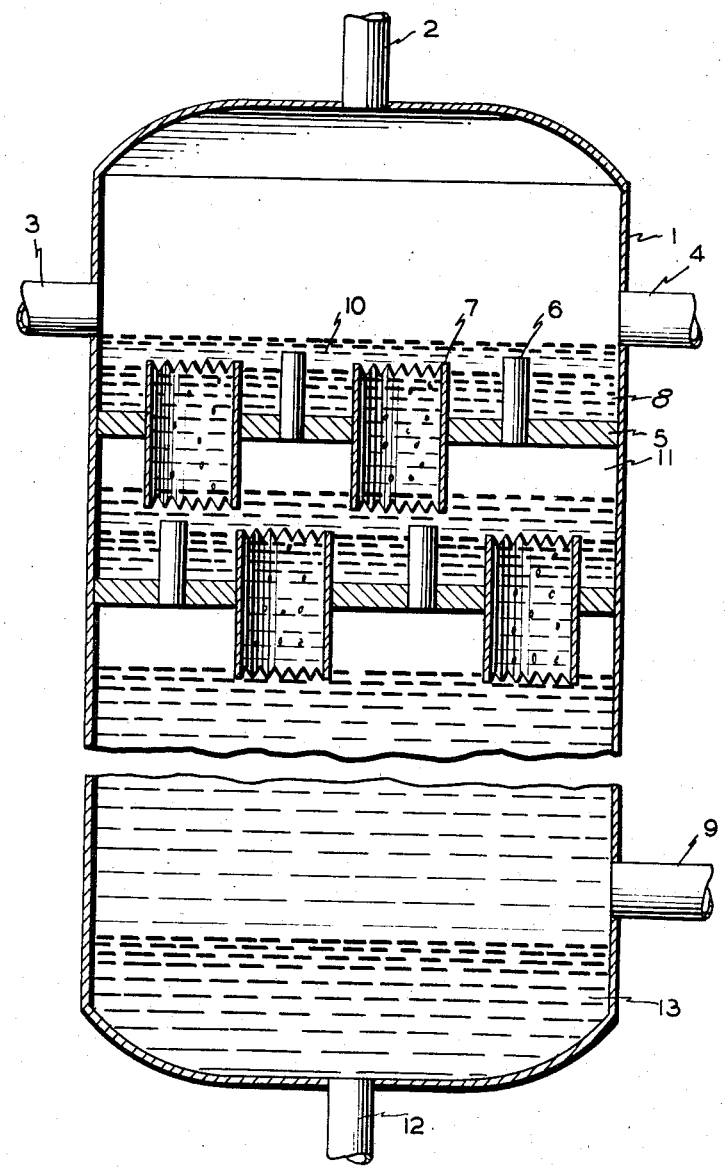
*INVENTOR.*
WALTER J. SAKOWSKI
BY
*Adams Forwardt McLean*
ATTORNEYS United States Patent Office 2,837,408
Patented June 3, 1958

2,837,408

PROCESS AND APPARATUS FOR THE CATALYTIC DECOMPOSITION OF ALKALI METAL AMALGAMS

Walter J. Sakowski, Youngstown, N. Y., assignor to Olin Mathieson Chemical Corporation, a corporation of Virginia Application June 29, 1954, Serial No. 440,196

3 Claims. (Cl. 23—184)

My invention relates to a process and apparatus for decomposing dilute amalgams with aqueous or alcoholic decomposing fluids in the presence of a catalyst. More particularly my invention relates to a process and apparatus for the above purpose which provides for contacting a dilute alkali amalgam and a decomposing fluid flowing countercurrently through a vertical decomposing zone while maintaining a plurality of horizontal amalgam-decomposing fluid interfaces in the decomposing zone in contact with a carbon catalyst.

For many years it has been a common practice to decompose dilute alkali metal amalgams formed in mercury cathode electrolytic cells in order to recover mercury for re-use in the cells. A valuable by-product, aqueous caustic soda, is obtained when water is used as the decomposing fluid. This process has, therefore, long been used as a source of concentrated solutions of caustic soda. Many amalgam-decomposing fluids have been employed including water, dilute aqueous caustic, lower aliphatic alcohols, and alcoholic solutions of alkali metal alcoholates. In general, any fluid which will react with an alkali metal can be used to decompose an alkali metal amalgam. The choice of decomposing fluid is usually made with a view to the value of the alkaline product formed in the reaction.

In general, innovations in the basic process have been made to provide more efficient contact between amalgam, decomposing fluid, and catalyst, and to conserve and utilize heat generated in the process. Many types of apparatus and processes have been devised which may be classified on the basis of whether flow of amalgam is horizontal or vertical.

Horizontal flow processes have been used on a large scale but have many inherent disadvantages. Amalgam is commonly allowed to flow along a substantially horizontal trough while water is flowed over the amalgam in a countercurrent direction. This method requires considerable floor space and conservation of heat generated in the reaction is difficult. A recent modification of the horizontal method is disclosed in United States Patent No. 2,610,908, issued September 16, 1952, to Deprez et al. The process of Deprez employs both concurrent and countercurrent flow of decomposing liquid.

The vertical flow methods of the prior art of current practical importance employ towers packed with coarse graphite which are usually operated in a completely flooded condition. The tortuous passages of these packed columns tend to restrict the escape of hydrogen generated by the process, thus effecting vigorous agitation of the liquids. Agitation of the liquids in the tower is highly undesirable since it causes mixing and dilution of concentrated caustic from one section of the tower with dilute caustic from another section. This prohibits production of caustic of greater than about 50% concentration since the effluent from the tower can be only a few percent more concentrated than the liquor in other sections of the tower. Agitation by the evolved hydrogen also causes attrition of the graphite packing with resultant loss of graphite catalyst and contamination of the caustic. Further, entrainment of concentrated caustic and amalgam by the escaping hydrogen causes plugging of the hydrogen lines with a mixture of solid caustic and mercury. This plugging of the hydrogen lines produces a high back pressure in the decomposing tower which forces hydrogen out through the liquor traps. Escaping hydrogen is, of course, a fire hazard and a menace to safety. Vertical flow processes of this type are also disadvantageous in that there is no control of the amalgam holding time, which fact makes complete removal of alkali metal from the amalgam difficult, especially after high concentrations of alkali have built up in the decomposing liquor.

A typical vertical flow amalgam decomposing device is disclosed in U. S. Patent 2,083,648 to Gorke, issued June 15, 1937. Another vertical flow process is shown in U. S. Patent 2,588,469 to Basilewsky, issued June 11, 1952. Basilewsky discloses a vertical amalgam decomposing tower divided into compartments. Horizontal partitions forming the compartments contain bubble caps and liquid seals to provide communication between the compartments. Each compartment also contains a number of trays or decomposing grids. Water and steam are introduced into the bottom of the tower, and caustic and hydrogen are removed from the top. Amalgam introduced into the tower at the top flows downwardly in the tower concurrent to the decomposing fluid from one compartment to the next through the liquid seals previously mentioned. The mercury produced is removed from the bottom of the tower. Lye formed in the tower is concentrated partly by vaporization of water which, although allowing the formation of concentrated caustic, requires an outside source of heat which is economically undesirable. Hydrogen formed in the tower also entrains mercury necessitating an additional recovery step. This is due to the fact that the tower is operated in a flooded condition so that provision for the removal of hydrogen is inadequate.

The process of the present invention comprises flowing dilute amalgam down through an amalgam decomposing zone countercurrent to an amalgam-decomposing fluid flowing upwardly while maintaining in the decomposing zone a plurality of horizontal amalgam-decomposing fluid interfaces, each of the interfaces being formed by a lower layer of amalgam and a supernatant layer of the decomposing fluid. The pairs of liquid layers, which are separated from each other by gas layers, are disposed one above the other in the decomposing zone. Each of the amalgam-decomposing fluid interfaces is in contact with catalyst means. Open passage zones are mechanically maintained to provide communication between the adjacent pairs of liquid layers in the decomposing zone. These passage zones allow flow of evolved hydrogen up through the decomposing zone without substantial agitation or mixture of the liquid layers. Spent amalgam, i. e., substantially pure mercury, is removed from the lower portion of the decomposing zone. Evolved hydrogen and decomposing fluid containing combined alkali metal from the amalgam are removed separately from the upper portion of the decomposing zone.

My new process differs from most vertical flow processes of the prior art in that the decomposing zone is maintained in a non-flooded condition. This feature of my invention together with the provision for horizontal amalgam-decomposing fluid interfaces allows maximum contact of amalgam and decomposing fluid without substantial agitation or mixture of the two liquids. The lack of vigorous agitation in my process allows the production of more concentrated solutions of caustic than previously obtainable since the concentrated caustic produced is not mixed with incoming water or dilute caustic. Hydrogen produced in my process has easy access to the hydrogen outlet through the mechanically maintained open passage zones mentioned above, with the result that entrainment of caustic and amalgam by hydrogen is negligible.

The apparatus of the present invention comprises a tower containing a plurality of trays disposed horizontally to provide a number of compartments in the tower. The tower may have a cross section of any desired shape, e. g., circular, rectangular or square. A rectangular tower is often preferred since it permits a compact arrangement of apparatus in a cell room and simplifies the construction of inlets from mercury cells and outlets from the decomposing tower. Each tray carries one or more downcomer means and catalyst means. The catalyst means can be composed of any suitable material, preferably graphite, and may take any suitable form. I have found that graphite rods are particularly suitable. The rods can be of any suitable dimensions but should exceed the height of the downcomer means above the tray as will be seen below. The catalyst must be in contact with both the amalgam and decomposing fluid in order to have a catalytic effect. Further, the effectiveness of the catalyst is directly proportional to the surface exposed to the amalgam-decomposing fluid interface. Therefore, when graphite rods are employed, it is preferred to use a large number of rods of small diameter rather than a smaller number of rods of large diameter. The catalyst means can be attached to the tray in any suitable manner, e. g., by press-fitting into the body of the tray. The mode of attachment should provide good electrical contact with the body of the tower and should be rigid to avoid attrition of the graphite.

The downcomer means can be made of any suitable material such as steel, glass, or graphite and can have any desired cross section, e. g., circular, rectangular or square. The downcomer means may preferably consist of one or more tubes inserted in the tray so that the opposite extremities of the tubes extend above and below the tray. The extremities of the tubes may preferably be serrated to facilitate flow of hydrogen, amalgam, and decomposing fluid through the tube.

Amalgams being much denser than decomposing fluids always form the lower layer of liquid on each tray in the apparatus. The depth of the amalgam layer on the trays is determined by the height of the downcomer means above the tray. In a preferred embodiment of the apparatus of my invention, in which the extremities of the downcomer tubes are serrated, the depth of the identations of the serrated upper edge of the downcomer tube determines the depth of the amalgam layer. Decomposing fluid, being lighter than amalgam, floats on the amalgam layer above each tray after flowing upward under pressure through the downcomer means. The lower extremities of the downcomer means extending below the next higher tray in the tower dips into the supernatant layer of decomposing fluid on the next lower tray. However, the lower extremities of the downcomer means are above the upper extremities of the downcomer means on the next lower tray. A blanket of evolved hydrogen is trapped between the layer of decomposing fluid and the lower surface of next higher tray in the tower. Thus the pressure of the evolved hydrogen prevents flooding of the tower by decomposing fluid. Hydrogen and decomposing fluid flow under the edge of the lower extremity of the downcomer means and up through the downcomer means to the next higher tray in the tower.

The graphite catalyst rods embedded in the tray should extend upwardly from the tray to a point above the upper extremity of the downcomer means so that the catalyst means will be in contact with the interface of amalgam and decomposing fluid which is determined by the height of the downcomer means above the tray as described above.

The trays in the decomposing zone are spaced at suitable intervals, one above the other. The distance between the trays is a matter of choice but should be sufficient to provide enough open space between the upper extremity of the downcomer means and the lower surface of the next higher tray to accommodate a layer of decomposing fluid and a blanket of trapped hydrogen.

In one modification of my new apparatus the downcomer means may be from ½ to 2 inches in diameter or preferably about 1¼ inches in diameter. The downcomer means may extend a suitable distance such as ⅛ to ¼ inch above the tray and about ½ inch below the tray. Thus assembled each tray may be very compact, e. g., 20 or more trays may be fitted into a tower having the same space requirements as a two foot packed tower. The apparatus of my invention will be described further with reference to the attached drawing.

The drawing shows a side elevation partly in section of one modification of the apparatus of my invention. The decomposing tower 1 is fitted with a pipe 2 in its top through which the evolved hydrogen is removed. Pipe 3 through which amalgam is introduced and pipe 4 from which decomposing fluid laden with alkali metal is removed are located in the upper portion of the tower above an upper tray. Trays 5 carry graphite rods 6 and downcomer tubes 7. Each downcomer tube 7 extends above and below tray 5. Only two downcomer tubes 7 and two graphite rods 6 are shown per tray; in practice, however, a large number would usually be employed. A layer of amalgam 8 is held on each tray 5 by the portion of the downcomer tubes 7 which extend above the tray. Excess amalgam overflows through the downcomer tubes 7 to the next lower tray in the tower.

Decomposing fluid is introduced into the tower through the pipe 9 which is located in the lower portion of the tower. The fluid rises to a level just above the lower edges of the tubes 7 on the lower tray 5. The fluid then flows upward through the downcomer tubes countercurrent to the descending amalgam. A layer of decomposing fluid 10 is maintained on each tray 5 above the layer of amalgam 8. Spent amalgam collects in the lower portion of the tower and is drawn off from layer 13 through pipe 12 preferably at such a rate that the layer of amalgam does not reach the level of decomposing fluid inlet means 9. The reaction of decomposing fluid with amalgam produces large volumes of hydrogen. The evolved gas accumulates in the spaces 11 below the lowest tray in the tower and between the layer of decomposing fluid 8 on each tray 5 and the bottom of the next higher tray in the tower. The pressure of the incoming decomposing fluid is maintained above the hydrogen pressure in the lowermost gas layer 11. The level of the decomposing fluid in each layer 10 is approximately coincident with the serrated indentations on the circumference of the lower end of the downcomer tubes. This allows hydrogen from the space 11 to bubble under the serrated lower edges of the downcomer tubes and up through the downcomers to the next higher compartment in the tower. This arrangement allows escape of the hydrogen with a minimum of agitation of the liquid layers in the tower.

In the method and apparatus of the present invention passages of large diameter are provided for the escape of hydrogen in contrast to the tortuous passages of the packed towers of the prior art. Further, the hold-up time of amalgam in the tower of my invention can be controlled, thus insuring complete decomposition of the amalgam. Towers of the prior art, packed with graphite or other materials, allowed amalgam to trickle downward by gravity through the packing material. Variation of the rate of feed to the tower did not alter the time required for amalgam to seep downward through the packing. My tower, on the other hand, is provided with horizontal trays which retain layers of amalgam and decomposing fluid in contact for a length of time determined by the rate at which the amalgam on each tray is displaced. Therefore, the holding time of amalgam can be adjusted by controlling the rate of feed of amalgam to the tower. Loss of graphite and contamination of caustic by graphite particles have also been disadvantages of the prior art processes employing packed towers. My process obviates these disadvantages since the lack of vigorous agitation decreases attrition of the graphite catalyst means.

In addition, in the process of my invention, the heat of reaction is effectively utilized to evaporate decomposing fluid so that high concentrations of caustic e. g., about 70% or more may be obtained in the effluent decomposing fluid. Each tray, at equilibrium, has its own particular concentrations in the two liquid phases, i. e., of alkali metal in amalgam and caustic in decomposing fluid and also its own particular temperature. For the above reasons operation of the new apparatus is easily controlled and maintained in a steady state.

My invention will be further illustrated by a specific example of the operation of the new process carried out in the embodiment of the novel apparatus shown in the drawing. Dilute sodium amalgam, containing about 0.15% sodium, obtained by electrolysis of brine in a mercury cathode electrolytic cell is introduced into the decomposition tower 1 through pipe 3. Water is introduced into the tower through pipe 9. The two liquids flow countercurrently through the tower forming a layer of amalgam 8 and a supernatant layer of water 10 on each tray 5. Amalgam overflows the upper serrated edge of the downcomer tubes 7 on each tray and passes to the next lower tray through the downcomer and in like manner to each succeeding tray until it reaches the bottom of the tower where it collects in layer 13. Water flows upwardly under pressure through the downcomer tubes 7 from tray to tray. The water reacts with the amalgam evolving hydrogen, generating heat, and forming an aqueous caustic soda solution which is withdrawn from the tower through pipe 4 above the uppermost tray. The concentration of sodium in the amalgam decreases at each tray from the top to the bottom of the tower, the spent amalgam which accumulates in layer 13 at the bottom of the tower being substantially pure mercury. The concentration of caustic soda in the water increases as the water progresses upward in the tower from tray to tray. Vaporization of a portion of the water by the heat of reaction helps to concentrate the caustic solution which reaches a maximum strength of 75% NaOH at the top of the tower. The temperature of the liquids on the trays increases travelling upward in the tower reaching a maximum temperature on one of the upper trays. Evolved hydrogen bubbles upward through the downcomer tubes 7 and passes out of pipe 2 at the top of the tower. Hydrogen accumulates in the gas layers defined by the lower surfaces of each tray and the surface of the caustic solution on the tray below and maintains the caustic layers approximately level with the lower extremities of the downcomer tubes. The pressure of incoming water is regulated to overcome the back pressure of the decomposer and to control the concentration of effluent caustic from the top of the decomposer.

My process is also carried out as above when decomposing other amalgams, e. g., an amalgam containing about 0.15% potassium with ethyl alcohol as a decomposing fluid. In this case, spent amalgam and an alcoholic solution of potassium ethylate are removed from the tower.

It is claimed:

1. In a vertical flow process for decomposing dilute alkali metal amalgams with an amalgam-decomposing fluid in the presence of a graphite catalyst the improvement which comprises flowing dilute alkali metal amalgam downwardly through an amalgam decomposing zone countercurrent to an amalgam-decomposing fluid flowing upwardly through the decomposing zone, maintaining in said decomposing zone a plurality of horizontal amalgam-decomposing fluid interfaces, each of said interfaces being formed by a pair of liquid layers consisting of a lower layer of amalgam and a supernatant layer of decomposing fluid, said pairs of liquid layers being disposed one above the other in said decomposing zone, maintaining graphite catalyst means in contact with each interface, maintaining open passage zones for communication between adjacent pairs of liquid layers in the decomposing zone, the upper openings of each of said passage zones being coincident with the interface defined by an upper pair of liquid layers and the lower opening of said passage zone being immersed in the supernatant layer of decomposing fluid of the next lower pair of liquid layers, said open passage zones allowing flow of amalgam downwardly and flow of evolved hydrogen and decomposing fluid upwardly in said zone, maintaining a layer of gaseous hydrogen between adjacent pairs of liquid layers, removing mercury from the bottom of said decomposing zone, and removing decomposing fluid from the top of said decomposing zone.

2. An apparatus for decomposing dilute amalgams which comprises in combination a vertical decomposing tower, a plurality of contacting trays disposed horizontally in said tower and dividing the tower into a plurality of compartments, downcomer tube means inserted in each of said trays providing communication between said compartments and permitting direct flow both to and from each of said compartments, the upper extremity of the downcomer means extending above the tray to define the height of an amalgam layer on the tray and the lower extremity of the downcomer means extending below the tray and above the upper extremity of the downcomer means on the next lower tray, said lower extremity of the downcomer means and the lower surface of said tray substantially defining an open space to accommodate a blanket of hydrogen, graphite catalyst means embedded in each of said trays and extending upwardly from said trays to a point above the upper extremity of the downcomer means, inlet means above an upper tray in said tower for dilute amalgam, outlet means above an upper tray in said tower for decomposing fluid, outlet means from the upper portion of said tower for evolved hydrogen, inlet means in the lower portion of said tower for decomposing fluid and outlet means in the lower portion of said tower for mercury.

3. An apparatus for decomposing dilute amalgams which comprises in combination a vertical decomposing tower, a plurality of contacting trays disposed horizontally in said tower and dividing the tower into a plurality of compartments, a plurality of downcomer tube means inserted in each of said trays providing communication between said compartments and permitting direct flow both to and from each of said compartments, the extremities of each downcomer tube means having a serrated edge, the upper extremity of each downcomer means extending above the tray to define the height of an amalgam layer on the tray and the lower extremity of the downcomer means extending below the tray and above the upper extremity of the downcomer means on the next lower tray, said lower extremity of the downcomer means and the lower surface of said tray substantially defining an open space to accommodate a blanket of hydrogen, a plurality of graphite catalyst means embedded in each of said trays, each of said catalyst means extending upwardly from the tray to a point above the upper extremity of the downcomer means, inlet means above an upper tray in said tower for dilute amalgam, outlet means above an upper tray in said tower for decomposing fluid, outlet means from the upper portion of said tower for evolved hydrogen, inlet means in the lower portion of said tower for decomposing fluid and outlet means in the lower portion of said tower for mercury.

References Cited in the file of this patent

UNITED STATES PATENTS

| | | | |
|---|---|---|---|
| 2,083,648 | Gorke | June 15, | 1937 |
| 2,191,919 | Thayer | Feb. 27, | 1940 |
| 2,588,469 | Basilewsky | Mar. 11, | 1952 |
| 2,732,284 | Sakowski | Jan. 24, | 1956 |